United States Patent [19]

Mehdipour et al.

[11] Patent Number: 4,603,390
[45] Date of Patent: Jul. 29, 1986

[54] COMPUTERIZED PARKING SYSTEM

[75] Inventors: Ebrahim Mehdipour, Santa Monica; Faramarz Mehdipour, Los Angeles; Fariborz Mehdipour, Santa Monica; Kambiz Imani, Los Angeles, all of Calif.

[73] Assignee: Soft Plus Corp., Los Angeles, Calif.

[21] Appl. No.: 586,205

[22] Filed: Mar. 5, 1984

[51] Int. Cl.⁴ ............................................. G06F 15/20
[52] U.S. Cl. ..................... 364/467; 340/51; 235/384
[58] Field of Search ........... 364/464, 467, 569; 377/9; 340/51; 194/DIG. 23; 235/384

[56] References Cited

U.S. PATENT DOCUMENTS

| | | | |
|---|---|---|---|
| 3,484,586 | 3/1963 | Wilson et al. | 340/51 |
| 3,575,586 | 4/1971 | Kroll | 340/51 |
| 3,705,976 | 12/1972 | Platzman | 235/384 |
| 3,794,966 | 2/1974 | Platzman | 340/51 X |
| 4,064,501 | 12/1977 | Yost et al. | 377/9 X |
| 4,303,904 | 12/1981 | Chasek | 235/384 X |
| 4,310,890 | 1/1982 | Trehn et al. | 364/467 |
| 4,493,103 | 1/1985 | Yamashita et al. | 235/384 X |

FOREIGN PATENT DOCUMENTS

| | | | |
|---|---|---|---|
| 2455317 | 12/1980 | France | 340/51 |
| 0139269 | 8/1983 | Japan | 235/384 |

Primary Examiner—Gary Chin
Attorney, Agent, or Firm—Keith D. Beecher

[57] ABSTRACT

A computerized parking system which includes a first camera for reading the license plate of a vehicle entering a parking area, and a second camera for reading the license plate of the vehicle as it leaves the parking area. In each instance, the letters and numbers on the license plate of each vehicle are converted into digital signals. The system responds to the digital signals from the cameras to determine the time of entry and time of exit of the vehicle, and the time vehicle remained in the parking area is then determined. The parking fee due for each vehicle is computed on the basis of a predetermined rate or rates and on the time in which the particular vehicle remained in the parking area. The system then produces a ticket, or a visual display, at a cashier's station at the exit on which the amount to be paid is recorded, and when that amount is paid the cashier opens the gate. In the case of a monthly customer, the gate may be opened automatically as the particular vehicle reaches the exit gate, and the amount due for that vehicle is accumulated within the computer for monthly billing. The system may also be automatic for the daily customer, with a currency machine being provided which opens the exit gate when the proper parking fee has been inserted into the machine.

11 Claims, 2 Drawing Figures

COMPUTERIZED PARKING SYSTEM

BACKGROUND OF THE INVENTION

Parking lots today for the most part are manually operated. The person parking his car receives a ticket from the parking attendant on which his time of entry is stamped. When the person leaves the parking area his ticket is again time stamped by the attendant, and the attendant calculates the amount of money to be paid by the customer. However, this practice is relatively costly and inefficient, cash security is at a minimum, and it also makes it easy for a dishonest attendant to misappropriate funds.

The computerized system of the invention is rapid and efficient, and it provides for a positive record to be maintained as to the time each vehicle was actually in the parking area, and the total amount of parking fees which should have been paid for each vehicle.

In general, the system of the invention provides for an effective management of a parking system, and provides the proprietor with improved control of the overall operation of the system, and specifically to provide optimum control of the cash register and to prevent any mishandling of funds. In addition, the system increases security since it can provide for all cash to be retained in theft-proof registers. The system further provides optimum traffic control regardless of the number of entrance and exit gates, including information as to the exact number of cars within the parking area at any time, and the license number of each car.

The system of the invention serves particularly to keep costs down and revenues up in the operation of a parking system. It provides constant monitoring of daily income, and can issue daily receipts for daily customers, as well as periodic billing, for monthly customers.

It will become evident as the description proceeds that although the system of the invention has particular utility with respect to parking lots, and it will be described in that environment in the subsequent specification, the system has other applications, such as in conjunction with toll roads, and the like, for monitoring motor vehicles by reading and storing the license plate numbers of the vehicles. The system can also be used for security purposes in the parking facilities of office and apartment buildings; as speed controls on highways and freeways; and to prevent theft of motor vehicles. The system also can be hooked into the police computer system and used to detect stolen cars or cars with outstanding citations, as they enter the facility.

DETAILED DESCRIPTION OF THE ILLUSTRATED EMBODIMENT

Figure 1:
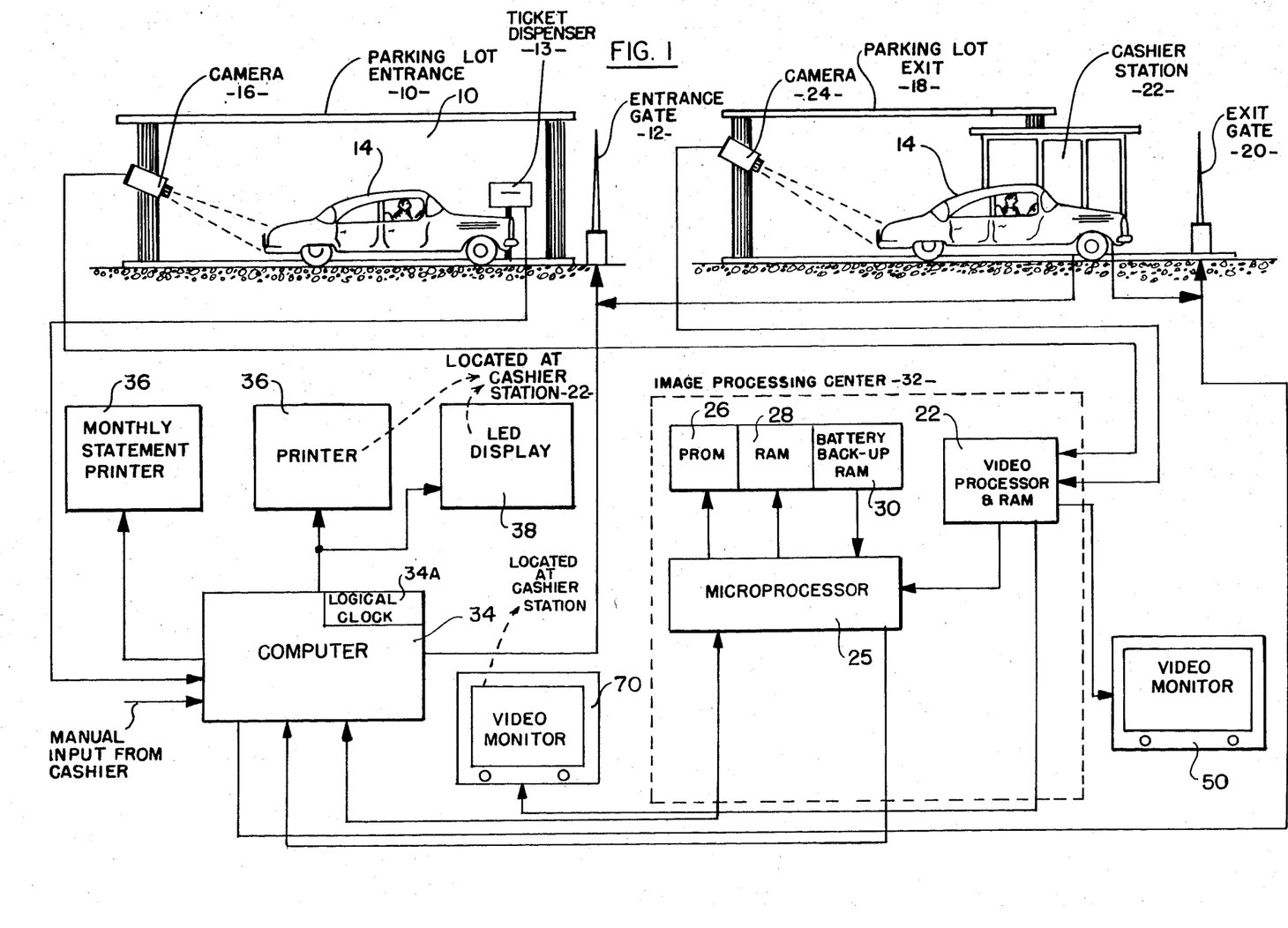
FIG. 1 is a schematic diagram, partly in block form, of a system constituting one embodiment of the invention.

The representation of FIG. 1 shows schematically a parking facility which includes an entrance 10 equipped with an entrance gate 12. As a motor vehicle 14 arrives at the entrance 10, its license plate is read by a camera 16, and the entrance gate 12 is automatically opened, enabling the vehicle to enter the parking area or facility. As an option, a ticket dispenser 13 may be located at the entrance gate. The gate is opened when the entering motorist withdraws a ticket.

The parking area also has an exit 18 which includes an exit gate 20. As the vehicle 14 leaves the parking area or facility, it is driven to the exit 18, and is stopped adjacent to a cashier's station 22. A second camera 24 senses the license plate of the vehicle 14 when it is stopped at the exit gate.

The cameras 16 and 24 are connected to a video processor and random access memory 22 which, in turn, is connected to a microprocessor 25. Microprocessor 25 is provided with a usual programmable read-only memory 26, a random access memory 28, and a battery powered back-up random access memory 30. A video monitor 50 is also provided to assist in adjusting the cameras.

The units described above constitute an image processing center 32 which serves to convert the information sensed by cameras 16 and 24 into corresponding digital signals, and to store the digital signals for processing by microprocessor 25. These signals, in each instance, correspond to the numbers and letters on the license plate of the vehicle 14, as the vehicle enters and leaves the parking facility. When the vehicle 14 arrives at the entrance 10, and as its license plate numbers and letters are sensed by camera 16, the video signals from the camera are processed in unit 22 which converts them to digital signals, and the resulting digital signals are fed to a microprocessor 25 which causes the digital signals which correspond to the license plate numbers to be stored in the memory of a computer 34. The corresponding digital signals are stored in the memory of computer 34, computer 34 provides a signal to entrance gate 12 causing the entrance gate to open, and permitting the vehicle to enter the parking area when there is no ticket dispenser. When a ticket dispenser 13 is provided, the gate 12 is opened when a ticket is withdrawn. At the same time, a number identifying the ticket is stored in the computer memory together with the license of the corresponding vehicle.

When the vehicle is driven to the exit 18, camera 24 senses the letters and numbers on its license plate and the corresponding video signals are processed in unit 22, and the corresponding digital signals are processed by microprocessor 25, and fed to the computer.

Computer 34 responds to the digital signals from microprocessor 25 and it compares the digital signals representing the license plate numbers with corresponding digital signals stored in its memory to identify the particular vehicle. The computer includes a logical clock 34A which causes digital signals representing the time a vehicle enters the area in the computer memory along with the digital signals identifying the vehicle, and which produces digital signals representing the time the identified vehicle leaves the area when the aforesaid comparison is made so as to determine the time in which the vehicle 14 remained in the parking facility, and to compute the parking fees due based on predetermined fee rates previously entered into the computer.

Computer 34 operates a printer 36 located, for example, at the cashier's station 22 to provide a printed record of the amount of parking fees due with respect to vehicle 14. When those fees have been paid to the cashier, the cashier by an appropriate manual control opens the exit gate 20. When ticket dispenser 13 is provided, the ticket may be inserted into printer 36 and a record of the charges may be printed on the ticket. As an alternative, for example, a light emitting diode display 38 may be located at the cashier's station 20 which provides a visual indication of the fee due for parking vehicle 14.

If desired, an automatic currency receiving machine 52 (FIG. 2) may be located at the cashier's station 22, which receives the appropriate parking fees, and provides change, if necessary. After the proper fees have been received by the machine, the exit gate 20 is automatically opened. The machine 52 may, for example, be of the type described in U.S. Pat. Nos. 4,321,671 and 4,310,885.

Certain of the cars parked in the parking area may be identified by computer 34 as monthly parkers, and when such a vehicle arrives at the exit 18, the computer 34 provides an output control to exit gate 20 automatically to open the exit gate. The computer 34 accumulates the parking fees due for the particular vehicles, and may be controlled on a daily, weekly, monthly, or other periodic basis to operate a printer 36, so that monthly statements may be prepared and sent to the owners of the particular vehicles.

It will be evident that a complete control over each vehicle within the parking area can be achieved by the system of FIG. 1, with the system being capable of providing information at any time as to all of the vehicles then parked within the facility, the time and date each vehicle entered the facility, and the length of time each vehicle remained in the facility.

The computer 34 also has the ability of printing on the ticket issued by printer 36 the name of the cashier then on duty at cashier's station 22. A video monitor 70 may be provided which may also be located at the cashier's station, and which may display the license number of each vehicle as it enters the facility. This permits the cashier to enter license numbers manually into the computer in the event camera 16 does not sense the license information.

The components of the image processing unit 32, and cameras 16 and 24, may form part of a system presently marketed by the General Electric Company, and designated the Alphavision System 100. The computer 34 may be any appropriate computer. For example, a computer marketed by Durango Systems, Inc., 3003 North First Street, San Jose, Calif. 95134, and designated as the Durango 900 is appropriate for use as computer 34.

Following is a typical source code for the computer 34 in order to program the Durango 900 computer to provide the functions described above.

The program provides a main menu:
(1) Input Mode
(2) Output Mode
(3) Information
(4) Monthly cars
 (1) For the Input Mode:
  (1) Entering License Plates
  (2) Select Entrance GAte.
  (3) Initialization of Ticket Numbers For Each Gate
 (2) For the Output Mode:
  (1) Cashier's Name
  (2) Rate Selection
  (3) Exiting License Plates
  (4) Total
 (3) Information
  (1) Print Daily Balance
  (2) List License Plate Numbers in Facility
  (3) Count Vehicles in Facility
  (4) Print Total Incoming Vehicles
  (5) Print Total Exiting Vehicles
  (6) Put Information in Auxiliary Memory
 (4) Monthly Cars
  (1) Print Out License Plates of Monthly Vehicle
  (2) Add Monthly Vehicle
  (3) Delete Monthly Vehicle
  (4) Change, Inquire
  (5) Prepare Statements STAR BASIC                                              RELEASE 2.5                          02/13/84
    PARKING SYSTEM

```
0010   1    TITLE       "PARKING SYSTEM"
0010   2                GOSUB INITIT
0013   3    MM:         GOSUB MAINMENU
0016   4                ON MENU GOSUB INPUT1,OUTPUT,INFO, CARD
0016   5                ELSE GOTO MM
0029   6
0029   7    MAINMENU:   PRINT (CARR=0) CS$(10),CP$(10,5),"MAIN MENU"
0046   8                PRINT CP$(10,7)," 1) INPUT MODE"
0061   9                PRINT CP$(10,9),"2) OUTPUT MODE"
007C   10               PRINT CP$(10,11),"3) INFORMATION"
0097   11               PRINT CP$(10,13),"4) MONTHLY CARS"
0083   12               INPUT (PROMPT=CP$(10,15)&"WHICH WOULD YOU LIKE? ")INPUT$
00D8   13               MENU=VAL(INPUT$)
00DF   14               RETURN
00E0   15   INPUT1:     PRINT (CARR=0) CS$(1),CP$(10,5)," 1) CASHIER NAME"
0104   16               PRINT CP$(10,7),  "2) STARTING TICKETS GATE A"
012B   17               PRINT CP$(10,9),  "3) STARTING TICKETS GATE B"
0152   18               PRINT CP$(10,11), "4) INPUT PLATE "
016E   19               PRINT CP$(10,13), "5) END"
0181   20               INPUT (PROMPT=CP$(10,15)& "WHICH WOULD YOU LIKE? ")INPUT$
01A6   21               AMENU=VAL(INPUT$)
01AD   22               ON AMENU GOSUB CA1,START1,START2,
01AD   23               INPLATE, EN1 ELSE GOTO INPUT1
0103   24               GOTO INPUT1
0106   25               RETURN
0107   26
```

| | | | |
|---|---|---|---|
| 0107 | 27 | OUTPUT: | PRINT (CARR=0) CS$(1),CP$(10,5), "1) CASHIER NAME" |
| 01EA | 28 | | PRINT CP$(10,7), "2) RATE SELECTION" |
| 020B | 29 | | PRINT CP$(10,9), "3) OUTPUT PLATES " |
| 0226 | 30 | | PRINT CP$(10,11), "4) TOTAL" |
| 023B | 31 | | PRINT CP$(10,13), "5) END" |
| 024E | 32 | | INPUT (PROMPT=CP$(10,15)& "WHICH WOULD YOU LIKE? ") INPUT$ |
| 0273 | 33 | | BMENU=VAL(INPUT$) |
| 027A | 34 | | ON BMENU GOSUB CASHER,RATES,OUTPLATE,TOTAL,EN1 ELSE GOTO OUTPUT |
| 0290 | 35 | | GOTO OUTPUT |
| 0293 | 36 | | RETURN |
| 0294 | 37 | INFO: | PRINT (CARR=0) CS$(1),CP$(10,3), "1) DAILY BALANCE" |
| 0268 | 38 | | PRINT CP$(10,4), "2) LIST OF PLATE NUMBERS" |
| 02DD | 39 | | PRINT CP$(10,5), "3) BACKUP" |
| 02F3 | 40 | | PRINT CP$(10,6), "4) COPY " |
| 0308 | 41 | | PRINT CP$(10,7), "5) CAR COUNT" |
| 0321 | 42 | | PRINT CP$(10,8), "6) TOTAL INCOMING PLATE NUMBERS" |
| 0340 | 43 | | PRINT CP$(10,9), "7) TOTAL OUTGOING PLATE NUMBERS" |
| 0379 | 44 | | PRINT CP$(10,10), "8) END" |
| 038C | 45 | | INPUT (PROMPT=CP$(10,13)& "WHICH WOULD YOU LIKE? ")INPUT$ |
| 03B1 | 46 | | CMENU=VALU(INPUT$) |
| 03B8 | 47 | | ON CMENU GOSUB DA,LIST1,BK,CO,BA,TI,TO1,EN1 ELSE GOTO INFO |
| 0304 | 48 | | GOTO INFO |
| 0307 | 49 | | RETURN |
| 03D8 | 50 | | |
| 03D8 | 51 | INITIT: | DIM INFO$(32,32) FIXED ,INPUT$(1),INPUT1$(5),INPUT2$(8),CO A$ |
| 03D8 | 52 | | INPUT3$(7), INPUT4$(1),INPUT5$(5),INPUT6$(7),PLATE$(7),CASHIN |
| 03D8 | 53 | | SEARCH$(7),INPUT7$(8),LOOK$(8),NAME$(5) FIXED,INPUT9$(8),GATE |
| 03D8 | 54 | | INPUT10$(14),INPUT11$(45),INPUT12$(6),INFO1$(80,20) FIXED |
| 03D8 | 55 | | DIM DATA1$(32,32) FIXED ,EEE$(1) |
| 03D8 | 56 | | OPEN (LFN=0) |
| 03DE | 57 | | MENU=0 |
| 03E1 | 58 | | AMENU=0 |
| 03E4 | 59 | | BMENU=0 |
| 03E7 | 60 | | CMENUO=0 |
| 03EA | 61 | | INP=0 |
| 03ED | 62 | | OUP=0 |
| 03F0 | 63 | | COMMON INFO$,RATE,S2,S3,S1,INP,OUP |
| 03F0 | 64 | | COMMON NAME$,TT |
| 03F0 | 65 | | FOR Z=1 TO 20 |
| 03FC | 66 | | INFO1$(9,Z;1)="0" |
| 0404 | 67 | | NEXT Z |
| 0407 | 68 | | FOR O=1 TO 32 |
| 0413 | 69 | | INFO$(25,0;1)="0" |
| 041C | 70 | | NEXT 0 |
| 041F | 71 | | RETURN |
| 0420 | 72 | | |
| 0420 | 73 | | |
| 0420 | 74 | CARD: | PRINT (CARR=0) CS$(1),CP$(10,5)," 1) PRINT OUT PERMANENT PLTS |
| 0452 | 75 | | PRINT CP$(10,6), "2) ADD PERMANENT PLATES" |
| 0476 | 76 | | PRINT CP$(10,7), "3) DELETE PERAMENT PLATES" |
| 0490 | 77 | | PRINT CP$(10,8), "4) CHANGE/INQUIRE PERMANENT PLATES" |
| 04CC | 78 | | PRINT CP$(10,9), "5) BACK UP" |
| 04E3 | 79 | | PRINT CP$(10,10), "6) COPY" |
| 04F7 | 80 | | PRINT CP$(10,11),"7) END " |
| 050B | 81 | | INPUT (PROMPT=CP$(10,13)& "WHICH WOULD YOU LIKE?  " ) INPUT     $ |
| 0531 | 82 | | FMENU=VAL(INPUT$) |
| 0538 | 83 | | ON FMENU GOSUB FF1,FF2,FF3,FF4,BK1,CO1,EN1 ELSE GOTO CARD |
| 0552 | 84 | | GOTO CARD |
| 0555 | 85 | | RETURN |
| 0556 | 86 | | |
| 0556 | 87 | FF1: | FOR K=1 TO 20 |
| 0562 | 88 | | IF INFO1$(9,K;1)="0" THEN |
| 056D | 89 | | GOTO ZI |
| 0570 | 90 | | ELSE |
| 0573 | 91 | | WRITE (LFN=0) "________________________________________" |
| 05A4 | 92 | | WRITE (LFN=0) "LIST OF PERMANENT PLATES" |
| 05C5 | 93 | | WRITE (LFN=0) "PLATE NUMBER=    ",INFO1$(1,K;7) |
| 05E5 | 94 | | WRITE (LFN=0) "PAYMENT= ",INFO1$(10,K;5) |
| 05FE | 95 | | WRITE (LFN=0) "DUE TIME= ",INFO1$(15,K;6) |
| 0618 | 96 | | WRITE (LFN=0) "OWNER NAME ",INFO1$(21,K;14) |

```
0634  97              WRITE (LFN=0) "ADDRESS "  ,INFO1$(35,K;45)
064E  98              WRITE (LFN=0) "______________________________________"
067F  99              END IF
067F  100  ZI:        NEXT K
0683  101             RETURN
0684  102
0684  103
0684  104  FF2:       PRINT (CARR=0) CS$(1)
068F  105             INPUT (PROMPT=CP$(10,5)&"PLEASE WRITE LICENCE PLATE NUMBER ")
06C0  106             INPUT (PROMPT=CP$(10,7)&"PLEASE WRITE PAYMENT ")INPUT5$
06E4  107             INPUT (PROMPT=CP$(10,9)&"PLEASE WRITE NEXT PAYMENT DUE DATE ")
0716  108             INPUT (PROMPT=CP$(10,11)&"PLEASE WRITE OWNER NAME ") INPUT1
073D  109             INPUT (PROMPT=CP$(10,13)&"PLEASE WRITE ADDRESS ")INPUT11$
0761  110             IN=0
0764  111
0764  112  AB1:       IN=IN+1
0769  113             IF IN=21 THEN GOSUB CARD
0773  114             IF INFO1$(9,IN;1)="1" THEN
077E  115               GOTO AB1
0780  116             ELSE
0783  117               INFO1$(9,IN;1)="1"
078B  118             ENDIF
078B  119             INFO1$(1,IN;7)=INPUT3$
0793  120             INFO1$(10,IN;5)=INPUT5$
079B  121             INFO1$(15,IN;6)=INPUT12$
07A3  122             INFO1$(21,IN;14)=INPUT10$
07aC  123             INFO1$(35,IN;45)=INPUT11$
07B6  124             GOSUB CARD
07B9  125             RETURN
07BA  126
07BA  127  BK1:       ALLOCATE (FILE="DATA2",RECLEN=85,NREC=50,UNIT=4)
07CE  128             OPEN (LFN=6,FILE="DATA2",OPT=1,UNIT=4)
07E0  129             REWIND (LFN=6)
07E6  130             FOR Q=1 TO 20
07F2  131  SUPER1:    TOLIST INFO1$(1,Q;80)
07FE  132             WRITE (LFN=6,TOLIST=SUPER1)
0808  133             NEXT Q
080B  134             CLOSE (LFN=6,OPT=0)
0813  135             RETURN
0814  136  CO1:       OPEN (LFN=6,FILE="DATA2",OPT=0,UNIT=4)
0826  137             REWIND (LFN=6)
082C  138             FOR Q=1 TO 20
0838  139  DUPER1:    TOLIST INFO1$(1,Q;80)
0844  140             READ(LFN=6,10LIST=DUPER1)
084E  141             NEXT Q
0851  142             CLOSE (LFN=6,OPT=1)
0859  143             RETURN
085A  144
085A  145  FF3:       PRINT CS$(1)
0863  146             INPUT (PROMPT=CP$(10,9)&"PLEASE WRITE LISENCE PLATE NUMBER ")
0894  147             FOR IM=1 TO 21
08A0  148             IF IM=21 THEN GOSUB CARD
08AA  149             IF INFO1$(1,IM;7)=INPUT3$ THEN GOTO AAA
08B5  150             NEXT IM
0888  151  AAA:       INFO1$(i,IM;1)="1"
08C0  152             GOSUB CARD
08C3  153             RETURN
08C4  154  FF4:       PRINT CS$(1)
08CD  155             INPUT (PROMPT=CP$(10,5)&"PLEASE WRITE LICENSE PLATE NUMBER ")
08FE  156             FOR IM=1 TO 21
090A  157             IF IM=21 THEN GOSUB CARD
0914  158             IF INFO1$(9,IM;1)="1" THEN
091F  159               IF INFO1$(1,IM;7)=INPUT3$ THEN GOTO BBB
092A  160             ELSE
092D  161               GOTO CCC
0930  162             ENDIF
0930  163  CCC:       NEXT IM
0933  164  BBB:       PRINT CS$(1)
093C  165             PRINT CP$(10,5),"1) LICENSE PLATE = ",INFO1$(1,IM;7)
0963  166             PRINT CP$(10,7),"2) PAYMENT= ",INFO1R(10,IM;5)
```

```
0983   167              PRINT CP$(10,9), "3) DUE DATE ",INFO1$(15,IM;6)
09A4   168              PRINT CP$(10,11),"4) OWNER NAME   ",INFO1$(21,IM;14)
09C8   169              PRINT CP$(10,13),"5) ADDRESS ",INFO1$(35,IM;45)
09E9   170              INPUT (PROMPT=CP$(10,15)&"WHICH WOULD YOU LIKE? ")INPUT$
0A0E   171              KMENU=VAL(INPUT$)
0A15   172              ON KMENU GOSUB LP,P,DD,ON1,AD ELSE GOTO BBB
0A2B   173
0A2B   174    LP:       PRINT CS$(1)
0A34   175              INPUT (PROMPT=CP$(10,9)&"PLEASE WRITE NEW LICENSE PLATE ") INP
0A62   176              INFO1$(1,IM;7)=INPUT3$
0A6A   177              PRINT CS$(1)
0A73   178              INPUT (PROMPT=CP$(10,9)&"ANY MORE CHANGE? ") INPUT$
0A93   179              IF INPUT$="Y" THEN GOTO FF4
0A9A   180              GOSUB CARD
0A9D   181    P:        PRINT CS$(1)
0AA6   182              INPUT (PROMPT=CP$(10,9)&"PLEASE WRITE NEW PAYMENT ")INPUT5$
0ACE   183              INFO1$(10,IM;5)=INPUT5$
0AD6   184              INPUT (PROMPT=CP$(10,11)&"ANY MORE CHANGE? ")INPUT$
0AF6   185              IF INPUT$="Y" THEN GOTO FF4
0AFD   186              GOSUB CARD
0B00   187    DD:       PRINT CS$(1)
0B09   188              INPUT (PROMPT=CP$(10,9)&"PLEASE WRITE NEW DUE TIME ")INPUT12$
0B32   189              INFO1$(15,IM;6)=INPUT12$
0B3A   190              INPUT (PROMPT=CP$(10,9)&"ANY MORE CHANGE? ")INPUT$
0b5A   191              IF INPUT$="Y" THEN GOTO FF4
0b61   192              GOSUB CARD
0864   193              PRINT CS$(1)
0B6D   194
0B6D   195              INPUT (PROMPT=CP$(20,9)&"PLEASE WRITE NAME OF NEW OWNER ")INP
0B9B   196              INFO1$(21,IM;14)=INPUT10$
0BA4   197              INPUT (PROMPT=CP$(10,11)&" ANY MORE CHANGE? ")INPUT$
0BC5   198              IF INPUT$="Y" THEN GOTO FF4
0BCC   199              GOSUB CARD
0BCF   200              PRINT CS$(1)
0BD8   201              INPUT (PROMPT=CP$(10,9)&"PLEASE WRITE NEW ADDRESS ")INPUT1$
0C00   202              INFO1$(35,IM;45)=INPUT11$
0C0A   203              INPUT (PROMPT=CP$(10,11)*"ANY MORE CHANGE? ")INPUT$
0C2A   204              IF INPUT$="Y" THEN GOTO FF4
0C31   205              GOSUB CARD
0C34   206              RETURN
0C35   207    CA1:      PRINT CS$(1)
0C3E   208              INPUT(PROMPT=CP$(10,9)&"PLEASE WRITE CASHIER NAME ")INPUT11$
0C67   209              CASHIN$=INPUT1$
0C6B   210              PRINT CS$(1)
0c74   211
0C74   212              RETURN
0C75   213
0C75   214    EN1:      GOTO MM
0C78   215              RETURN
0c79   216
0C79   217
0c79   218    START1:   PRINT CS$(1)
0C82   219              INPUT (PROMPT=CP$(10,9)& "PLEASE WRITE STARTING TICKET"
0C87   220              " FOR DATE NO A   ")INPUT2$
0CBF   221              S2=VAL(IMPUT2$)
0CC6   222              PRINT CS$(1)
0CCF   223              RETURN
0CD0   224
0CD0   225    START2:   PRINT CS$(1)
0CD9   226              INPUT (PROMPT=CP$(10,9)& "PLEASE  WRITE STARTING TICKET"
0CDE   227              " FOR GATE NO. B   ")INPUT9$
0D17   228              S3=VAL(INPUT9$)
0D1E   229              PRINT CS$(1)
0D27   230              RETURN
0D28   231
0D28   232
0D28   233
0D28   234
0D28   235    INPLATE:  PRINT CS$(1), CP$(10,3),"DON,T HIT SPACES"
0D4A   236              INPUT (PROMPT=CP($10,9)& "PLEASE WRITE ENTERING PLATES ")INPUT
```

```
0D76  237           PLATE$=INPUT3$
0D7A  238
0D7A  239           IF PLATE$="7" THEN GOSUB INPUT1
0D84  240           IF PLATE$="\" THEN GOSUB OUTPLATE
0D8E  241           IF PLATE$=" " THEN GOTO IN1
0D95  242           PRINT (CARR=0) CS$(1)
0DA0  243   H3:     INPUT (PROMPT=CP$(10,7)&"PLEASE WRITE GATE NUMBER (A OR B)   ')
0DD1  244           GATE$=INPUT4$
0DD8  245           IF GATE$="A" THEN  GOTO H1
0DDC  246           IF GATE$="B" THEN GOTO H2
0DE3  247
0DE3  248   HOLD1:  IF KEYIN$="" THEN GOTO HOLD1
0DE9  249           EEE$=KEYIN$
0DEE  250           FOR I=1 TO 7
0DF9  251           COME$(I;1)=EEE$
0E00  252           NEXT I
0E03  253           PLATE$=COME$
0E07  254   H1:     S1=S2
0E08  255           S2=S2+1
0E10  256           GOTO TIME
0E13  257   H2:     S1=S3
0E17  258           S3=S3+1
0E1C  259   TIME:   A=DTE$
0E22  260           A1=A/100
0E2A  261           A2=INT(A1)
0E31  262           A3=A2/100
0E39  263           A4=INT(A3)
0E40  264           A5=100*A4
0E48  265           A6=A2-A5
0E4E  266           A7=A4/100
0E56  267           A8=INT(A7)
0E5D  268           A9=100*AB
0E65  269           A10=A4-A9
0E6B  270           A11=A8/100
0E73  271           A12=INT(A11)
0E7A  272           A111=100*A12
0E82  273           A131=AB-A121
0E88  274           A13=A12/100
0E90  275           A14=INT(A13)
0E97  276           A15=100*A14
0E9F  277           A16=A12-A15
0EA5  278   01:     I=0
0EA8  279   02:     I=I+1
0EAD  280           IF I=32 THEN
0EB4  281             PRINT CSR(1),CP$(10,9),"PARKING IS FULL"
0ED5  282             INPUT (PROMPT=CP$(10,11)& "ENTER NES TO CONTINUE")INPUT$
0EF9  283             IF INPUT$="Y" THEN GOSUB MAINMENU
0F03  284           ELSE
0F06  285             GOTO GG
0F09  286           END IF
0F09  287   GG:     IF INFO$ (25,I;1)="1" THEN
0F15  288             GOTO 02
0F17  289           ELSE
0F1A  290              INFO$(25,I;1)="1"
0F23  291           ENDIF
0F23  292           INFO$ (1,I;7)=PLATE$
0F2B  293           INFO$ (B,I;2)=A14
0F34  294           INFO$ (10,I;2)=A16
0F3D  295           INFO$ (12,I;2)=A10
0F46  296           INFO$ (14,I;2)=A6
0F4F  297           INFO$ (16,I;8)=S1
0F59  298           INFO$ (24,I;1)=GATE$
0F62  299           INFO$ (26,I;5)=CASHIN$
0F6B  300           INFO$ (31,I;2)=A131
0F75  301           INP=INP+1
0F7A  302           WRITE (LFN=0) "________________________          "
0F9F  303           WRITE (LFN=0) "             INPUT CAR           "
0FC3  304           WRITE (LFN=0) "PLATE NUMBER= ",PLATE$
0FDD  305           WRITE (LFN=0 "ARRIVAL TIME= ",INFO$(8,I;6),"1",INFO$(14,I;2)
1005  306           WRITE (LFN=0) "CASHIER NAME ", CASHIN$
```

| | | | |
|---|---|---|---|
| 101E | 307 | | WRITE (LFN=0) "TICKET NUMBER= ",S1 |
| 1039 | 308 | | WRITE (LFN=0) "_______________________" |
| 105E | 309 | | GOTO INPLATE |
| 1061 | 310 | IN1: | PRINT CP$(10,3), "TRY AGAIN" |
| 1077 | 311 | | GOTO INPLATE |
| 107A | 312 | IN3: | RETURN |
| 107B | 313 | | |
| 107B | 314 | RATES: | PRINT CS$(1), CP$(10,5), "1) NORMAL" |
| 1096 | 315 | | PRINT CP$(10,7), "2) SPECIAL" |
| 10AD | 316 | | INPUT (PROMPT=CP$(10,9)& "WHICH WOULD YOU LIKE? ")INPUT$ |
| 1022 | 317 | | IF VAL(INPUT$)=1 THEN GOTO BACK |
| 10DB | 318 | | RATE2=2.00 |
| 10DE | 319 | | RATE=RATE2 |
| 10E2 | 320 | | GOTO GEN |
| 10E5 | 321 | BACK: | RATE1=3.5 |
| 10EB | 322 | | RATE=RATE1 |
| 10EF | 323 | GEN: | RETURN |
| 10F0 | 324 | | |
| 10F0 | 325 | CASHER: | PRINT CS$(1) |
| 10F9 | 326 | | INPUT (PROMPT=CP$(10,9)& "CASHIER NAME PLEASE ")INPUT5$ |
| 111D | 327 | | NAME$=INPUT5$ |
| 1121 | 328 | | RETURN |
| 1122 | 329 | | |
| 1122 | 330 | OUTPLATE: | PRINT CS$(10, CP$(10,3), "DON,T HIT SPACES" |
| 1144 | 331 | | INPUT(PROMPT=CP$(10,9)&"ENTER DEPARTING PLATE NUMBER ")INPUT6 |
| 1170 | 332 | | SEARCH$=INPUT6$ |
| 1174 | 333 | | IF SEARCH$="/" THEN GOSUB OUTPUT |
| 117E | 334 | | IF SEARCH$="\" THEN GOSUB INPLATE |
| 1188 | 335 | | IF SEARCH$="0000000" THEN GOTO OUTPLATE |
| 1195 | 336 | | GOTO BB3 |
| 1198 | 337 | HOLD2: | IF KEYIN$="" THEN GOTO HOLD2 |
| 119E | 338 | | EEE$=KEYIN$ |
| 11A3 | 339 | | FOR I=1 TO 7 |
| 11AE | 340 | | COME$(I;1)=EEE$ |
| 11B5 | 341 | | NEXT I |
| 11B8 | 342 | | SEARCH$=COME$ |
| 11BC | 343 | | |
| 11BC | 344 | | |
| 118C | 345 | | |
| 11BC | 346 | BB3: | FOR IM=1 TO 20 |
| 1108 | 347 | | IF INFO1$(1,IM;7)=SEARCH$ THEN |
| 11D3 | 348 | | INFO1$(i,IM;1)="0" |
| 11DB | 349 | | PRINT CS$(1),CP$(10,9),"MONTHLY CARS---NO PAYMENT " |
| 1207 | 350 | | POP=1 |
| 120A | 351 | | INPUT(PROMPT=CP$(10,11)& "ENTER YES TO CONTINUE ") INPUT$ |
| 122F | 352 | BB2: | IF INPUT$="Y" THEN GOTO F1 |
| 1236 | 353 | | GOTO BB2 |
| 1238 | 354 | | ELSE |
| 123B | 355 | | GOTO FBC |
| 123E | 356 | | ENDIF |
| 123E | 357 | FBC: | NEXT IM |
| 1241 | 368 | F1: | N=0 |
| 1249 | 359 | F1: | N=N+1 |
| 1249 | 360 | | |
| 1249 | 361 | | IF N=33 THEN |
| 1250 | 362 | | GOTO PROB |
| 1253 | 363 | | ELSE |
| 1256 | 364 | | GOTO CONTI |
| 1259 | 365 | | ENDIF |
| 1259 | 366 | PROB: | PRINT CS$(1), CP$(10,7),"NOT FOUND" |
| 1274 | 367 | | SELL$=CHR$(7) |
| 127A | 368 | | INPUT(PROMPT=CP$(10,9)& "ENTER THE TICKET NUMBER ")INPUT7$ |
| 12A1 | 369 | | LOOK$=INPUT7$ |
| 12A5 | 370 | FFF1: | N=0 |
| 12A8 | 371 | FFF2: | N=N+1 |
| 12AD | 372 | | IF N=33 THEN |
| 1204 | 373 | | GOTO PROB1 |
| 12B7 | 374 | | ELSE |
| 12BA | 375 | | GOTO CONT2 |
| 12BD | 376 | | ENDIF |
| 12BD | 377 | PROB1: | PRINT CS$(1),CPR(10,7), "NOT FOUND CALL YOUR SUPERVISOR" |
| 12ED | 378 | | BELL$=CHR$(7) |

```
12F3  379  FF:      INPUT(PROMPT=CP$(10,9)&"PRESS YES PLEASE TO CONTINUE    ")INPUT$
1320  380           IF INPUT$="Y" THEN GOTO MM
1327  381
1327  382           GOTO FF
1329  383  CONT2:   IF INFO$(16,N;8)=LOOK$ THEN
1335  384                GOTO F4
1338  385           ELSE
133B  386                GOTO FFF2
133E  387           ENDIF
133E  388  CONTI:   IF INFO$(1,N;7)=SEARCH$ THEN
1349  389                GOTO F4
134C  390           ELSE
134F  391             GOTO F2
1352  392           ENDIF
1352  393  F4:      IF INFO$(1,N;7)=0000000" THEN GOTO OUTPLATE
1364  394
1364  395  FBI:     IF POP=1 THEN
136A  396             OUP=OUP+1
136F  397             INFO$(25,N;1)="0"
1378  398             POP=0
137B  399             GOTO OUTPLATE
137E  400           ELSE
1381  401             GOTO F3
1384  402           ENDIF
1384  403  F3:      8=DTE$
138A  404
138A  405           B1=B/100
1392  406           B2-INT(B1)
1399  407           B3-B2/100
13A1  408           B4=INT(B3)
13A8  409           B5=100*B4
13B0  410           B6=B2-B5
13B6  411           B7=B4/100
13BE  412           BB=INT(B7)
13D5  413           B9=100*BB
13CD  414           B10=B4-B9
13D3  415           B11=B8/100
13DB  416           B12=INT(B11)
13E2  417           B121=100*A12
13EA  418           8131=88=8111
13F0  419           B13=B12/100
13F8  420           B14=INT(B13)
13FF  421           B15=100*B14
1407  422           B16=B12-B15
140D  423           K131=VAL(INFO$(31,N;2))
1419  424           D1=B131-K131
141F  425           Y=0
1422  426           IF D1 GT Y THEN o11=D1*12
142F  427           K14-VAL (INFO$(8,N;2))
143A  428           02=B14-K14
1440  429           IF D2 LT Y THEN GOTO P1
1447  430           IF D2 EQ Y THEN GOTO P3
1441  431           IF D2 GT Y THEN GOTO P3
1445  432  P1:      M1=12-K14
145A  433           D3=B14+M1
1460  434           D11=0
1463  435           GOTO P4
1466  436  P3:      D3=D11+D2
146C  437  P4:      K16=VAL (INFO$(10,N;2))
1477  438           D16=B16-K16
147D  439           K10=VAL (INFO$(12,N;2))
1488  440           D10=B10-K10
148E  441           K6=VAL(INFO$(14,N;2))
1499  442           D6=B6-K6
149F  443           T1=D11*35+D16*RATE
14AB  444           IF T1=0 THEN T1=2
14B5  445           T=T1+T
14BB  446           TT=TT+T
14C1  447
14C1  448  SSS:     OUP=OUP+1
```

```
14C6  449           INFO$(25,N;1)="0"
14CF  450           PRINT CS$(1), CP$(10,7), "PAYMENT= ",T1
14ED  451           PRINT CP$(10,9), "PLATENUMBER= ", INFO$(1,N;7)
150E  452           PRINT CP$(10,11), "TICKETNUMBER= ",INFO$(16,N;8)
1530  453           PRINT CP$(10,13), "ARRIVAL="," (","MONTH= ",INFO$(8,N;2),"D. /=
155F  454           INFO$(10,N;2), "HOUR= ",INFO$(12,N;2),"MINUTE= ",INFO$(14,N;2)
158A  455           WRITE (LFN=0) "                              "
15AF  456           WRITE (LFN=0) "         OUTPUT CAR          "
1504  457           WRITE (LFN=0) "PLATE NUMBER= ",INFO$(1,N;7)
15F2  458           WRITE (LFN=0) "PAYMENT= ",T1 ,"$"
160A  459           WRITE (LFN=0) "TICKETNUMBER= ",INFO$(16,N;8)
1629  460           WRITE (LFN=0) "ARRIVALTIME= ",INFO$(8,N;6),":",INFO$(14,N;2)
1650  461           WRITE (LFN=0) "CASHIER NAME= ",NAME$
166A  462           WRITE (LFN=0) "                              "
168F  463           INFO$(1,N;7)="0000000"
169E  464  MNR:     INPUT (PROMPT=CP$(10,15)&"PRESS YES PLEASE TO CONTINUE    ")INPUT
16CB  465           IF INPUT$="Y" THEN GOTO OUTPLATE
16D2  466           GOTO MNB
16D1  467           RETURN
16D5  468  TOTAL:
16D5  469
16D5  470           WRITE (LFN=0) "CASHIER NAME  ",NAME$ ,"      TOTAL=",T
1700  471           T=0
1703  472           RETURN
1704  473  DA:      WRITE (LFN=0) " DAILY=  ",TT
1719  474           TT=0
171C  475           RETURN
171D  476  BA:      F=0
1720  477           FOR K=1 TO 32
1720  478           IF INFO$(25,K;1)="1"  THEN F=F+1
1730  479           NEXT K
1740  480
1740  481           WRITE (LFN=0) "CAR COUNT=  ",F
1758  482           RETURN
1759  483  BK:      ALLOCATE (FILE="DATE1",RECLEN=50,NREC=100,UNIT=4)
176F  484
176F  485           OPEN (LFN=7,FILE="DATA1",OPT=1,UNIT=4)
1781  486           REWIND (LFN=7)
1787  487           FOR Q=1 TO 32
1793  488  SUPER:   IOLIST INFO$(1,Q;32)
179F  489           WRITE (LFN=7,IOLIST=SUPER)
17A9  490           NEXT Q
17AC  491           CLOSE (LFN=7,OPT=0)
17B4  492           RETURN
17B5  493
17B5  494  CO:      OPEN (LFN=7,FILE="DATA1",OPT=0,UNIT=4)
1707  495           REWIND (LFN=7)
17CD  496           FOR Q=1 TO 32
1709  497  DUPER:   IOLIST INFO$(1,G;32)
17E5  498           READ (LFN=7,IOLIST=DUPER)
17E5  499           NEXT Q
17F2  500           CLOSE (LFN=7,OPT=1)
17FA  501           RETURN
17FB  502  TI:      WRITE (LFN=0) "TOTAL INCOMING PLATE NUMBERS= ",INP
1825  503           INP=0
182B  504           RETURN
1829  505
1829  506  TO1:     WRITE (LFN=0) "TOTAL OUTGOING PLATE NUMERS= ",OUP
1852  507           OUP=0
1828  508           RETURN
1856  509
1856  510
1856  511  LIST1:   FOR K=1 TO 32
1862  512           IF INFO$(25,K;1)="0" THEN GOTO LIST2
186E  513
186E  514           WRITE (LFN=0) "                              "
189F  515           WRITE (LFN=0) " LIST OF PLATE NUMBERS        "
18D0  516           WRITE (LFN=0) "PLATE NUMBER= ",INFO$(1,K;7)
1SEE  517           WRITE (LFN=0) "TICKET NUMBER=" ,INFO$(16,K;8)
190D  518           WRITE (LFN=0) "ARRIVAL TIME=" ,INFO$(8,K;6),":",INFO$(14,N;2)
```

```
1934 519              WRITE (LFN=0)  "CASHIER NAME ",INFO$(26,K;5)
1952 520              WRITE (LFN=0)  "                                              "
1983 521    LIST2:    NEXT K
1987 522              RETURN
1988 523              STOP
198A 524              END
```

(0000): 38% symbol table used

Code 6540, variables 4088, common 1085, no errors

Pages program, 5 pages common storage required

Figure 2:
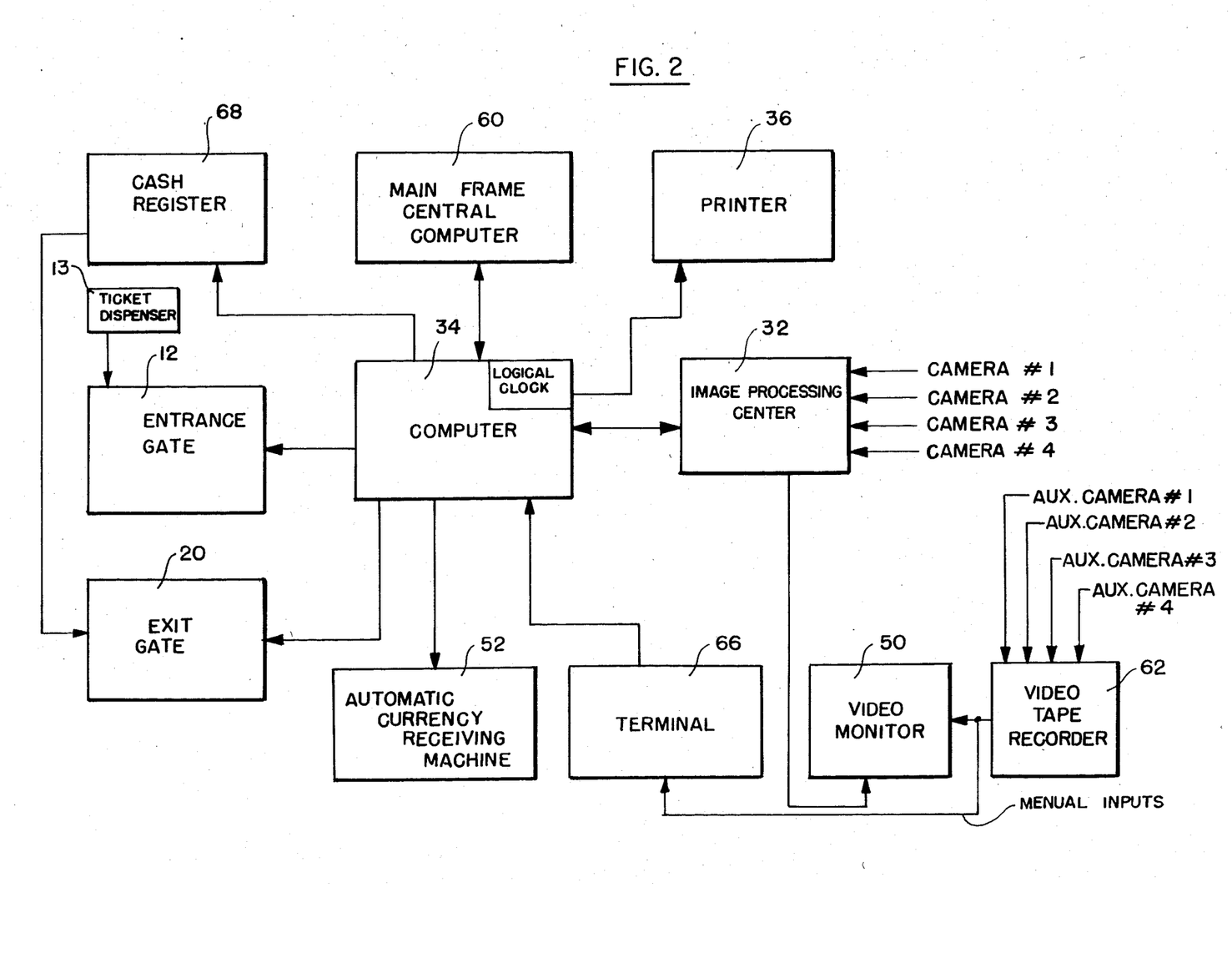
FIG. 2 is a block diagram illustrating various options which can be incorporated into the system.

Various options for the system are represented in the block diagram of FIG. 2. It is evident that other options are possible.

Computer 34 may be connected by an appropriate communication link to a main frame computer 60 which may be located in a control office and which may keep track of a number of parking facilities.

Four or more cameras may be connected to video processor 22 depending upon the number of entrance and exit gates in the facility. Four or more auxiliary video cameras may be positioned at the various gates which are connected to a video tape recorder 62. These cameras provide auxiliary video images of the rear ends, including licenses of the cars entering and exiting the facility in the event the main cameras are not able to record the license numbers. The auxiliary images appear on monitor 50 at the cashier station 22, and this enables the cashier to input the appropriate information into the computer 34 manually, by means, for example, of a terminal 66.

A computer 34 may also control the cash register 68 at the cashier station to cause the cash register to record the amount of cash which should have been received for each transaction. The cash register 68 may control the exit gate so that the exit gate will open only after the proper cash payment has been entered in the cash register.

It will be appreciated that while a particular embodiment of the invention has been shown and described, modifications may be made. It is intended in the claims to cover all modifications which come within the true spirit and scope of the invention.

What is claimed is:

1. A system for detecting the time vehicles remain in a particular area, and area having an entrance and an exit, each of the vehicles being equiped with a license plate, said system including: a first camera mounted at the enterance of the area positioned to be directed at the license plate of each vehicle entering the area; a processing system connected to the camera for converting the indicia on the license plate as sensed by the camera into corresponding digital signals; memory means included in the system for storing the aforesaid digital signals; a second camera mounted at the exit of the area in position to be directed at the license plate of each vehicle leaving the area, said second camera being connected to said processing system to enable the processing system to convert the indicia on the license plate as sensed by the second camera into corresponding digital signals; and computer means connected to the processing system including a logical clock for storing in the memory means signals representative of the time each vehicle entered the area as sensed by the first camera means and responding to the digital signals from said processing system representing indicia sensed by the second camera to determine the time each vehicle remained in the area.

2. The system defined in claim 1, in which said computer means includes means for computing the total fee due for each vehicle based on the time the vehicle remained in the area and a predetermined fee rate.

3. The system defined in claim 2, and which includes output means connected to the computer including display means located at the exit for displaying the fee due for each vehicle as the vehicle leaves the area.

4. The system defined in claim 3, in which said output means includes a printer located at the exit for printing a receipt on which the fee is imprinted.

5. The system defined in claim 2, in which said computer means includes memory means for storing signals representing accumulated fees for selected vehicles entering and leaving the area, and printer means connected to the computer means for providing periodic statements on which the accumulated fees are imprinted.

6. The system defined in claim 1, and which includes a gate included at said entrance, and means connecting said processing system to said gate to cause said gate to open when the indicia on the license plate of a vehicle is sensed by said first camera.

7. The system defined in claim 1, and which includes video monitor means connected to said first and second cameras for displaying the indicia of the license plate sensed thereby.

8. The system defined in claim 1, and which includes a gate located at said entrance, and a ticket dispenser located adjacent to said gate and connected to said processing system to cause said gate to open after the indicia on the license plate has been sensed and when a ticket is withdrawn from said dispenser and to cause data identifying the ticket to be stored in said memory means.

9. The system defined in claim 8, and which includes output means connected to said computer and including a printer located at said exit gate for receiving said ticket and for imprinting a receipt of the fee.

10. The system defined in claim 2, and which includes a gate located at said exit; and automatic currency receiving means located at said gate and connected to said computer for causing said gate to open after the proper fee has been inserted into said receiving means.

11. The system defined in claim 1, and which includes a main frame computer located at a remote control center; and a communication link connecting said main frame computer to said computer means.

* * * * *